United States Patent
Peris

(10) Patent No.: US 11,369,108 B2
(45) Date of Patent: Jun. 28, 2022

(54) EMULSION CONCENTRATES OF LIPOPHILIC COMPOUNDS

(71) Applicant: Bayer CropScience Aktiengesellschaft, Monheim am Rhein (DE)

(72) Inventor: Gorka Peris, Cologne (DE)

(73) Assignee: BAYER CROPSCIENCE AKTIENGESELLSCHAFT, Monheim am Rhein (DE)

( * ) Notice: Subject to any disclaimer, the term of this patent is extended or adjusted under 35 U.S.C. 154(b) by 0 days.

(21) Appl. No.: 16/064,079

(22) PCT Filed: Dec. 19, 2016

(86) PCT No.: PCT/EP2016/081671
§ 371 (c)(1),
(2) Date: Jun. 20, 2018

(87) PCT Pub. No.: WO2017/108662
PCT Pub. Date: Jun. 29, 2017

(65) Prior Publication Data
US 2019/0000074 A1    Jan. 3, 2019

(30) Foreign Application Priority Data
Dec. 22, 2015   (EP) .................... 15201870

(51) Int. Cl.
*A01N 25/02* (2006.01)
*A01N 27/00* (2006.01)
*A01N 31/02* (2006.01)
*A01N 31/08* (2006.01)
*A01N 35/02* (2006.01)
*C08L 71/02* (2006.01)

(52) U.S. Cl.
CPC .............. *A01N 25/02* (2013.01); *A01N 27/00* (2013.01); *A01N 31/02* (2013.01); *A01N 31/08* (2013.01); *A01N 35/02* (2013.01); *C08L 71/02* (2013.01)

(58) Field of Classification Search
CPC ........ A01N 25/02; A01N 27/00; A01N 31/02; A01N 31/08; A01N 35/02; A01N 25/30; C08L 71/02
See application file for complete search history.

(56) References Cited

U.S. PATENT DOCUMENTS

| | | | |
|---|---|---|---|
| 5,827,522 A * | 10/1998 | Nowak ................ | A01N 25/04 424/405 |
| 2007/0178128 A1 | 8/2007 | Bessette | |
| 2009/0022824 A1 * | 1/2009 | Akhil .................... | A01N 47/46 424/740 |
| 2009/0257958 A1 * | 10/2009 | Sims ..................... | A01N 27/00 424/45 |
| 2010/0316738 A1 * | 12/2010 | Jimenez ................ | A01N 27/00 424/725 |
| 2013/0065763 A1 * | 3/2013 | Merlet .................. | A01N 25/02 504/352 |

FOREIGN PATENT DOCUMENTS

| | | |
|---|---|---|
| EP | 2387886 A1 | 11/2011 |
| WO | 03/075657 A1 | 9/2003 |
| WO | 2009/126577 A2 | 10/2009 |
| WO | 2010/144919 A1 | 12/2010 |
| WO | 2011/098419 A2 | 8/2011 |
| WO | 2013/083372 A1 | 6/2013 |
| WO | 2013/083405 A1 | 6/2013 |
| WO | 2014/154447 A1 | 10/2014 |
| WO | 2014/154448 A1 | 10/2014 |
| WO | 2015/007573 A1 | 1/2015 |
| WO | 2015/121119 A1 | 8/2015 |

OTHER PUBLICATIONS

PCT International Search Report for PCT/EP2016/081671, dated Feb. 20, 2017.
"Purasolv in agrochemical formulations," Purac, (2011), pp. 1-2.

* cited by examiner

*Primary Examiner* — Matthew P Coughlin
*Assistant Examiner* — Thurman Wheeler
(74) *Attorney, Agent, or Firm* — McBee Moore & Vanik IP, LLC

(57) ABSTRACT

The present invention relates to new, solvent-based emulsifiable concentrates of agrochemical active compounds, a process for the preparation of these formulations and their use for the application of the active compounds contained.

18 Claims, No Drawings

EMULSION CONCENTRATES OF LIPOPHILIC COMPOUNDS

CROSS-REFERENCE TO RELATED APPLICATIONS

This application is a National Stage entry of International Application No. PCT/EP2016/081671, filed Dec. 19, 2016, which claims priority to European Patent Application No. 15201870.1, filed Dec. 22, 2015.

BACKGROUND

Field

The present invention relates to new, solvent-based emulsifiable concentrates of agrochemical active compounds, a process for the preparation of these formulations and their use for the application of the active compounds contained.

Description of Related Art

Some terpenoid substances originating from plant extracts are known to be biologically active. For instance, the terpenes alpha-terpinene, d-limonene, para-cymene, have been shown to possess insecticidal and miticidal activity (WO-A 2010/144919), which could turn these molecules into useful plant protection products. This would be desirable since their biological activity is quite selective against the target pests. Moreover, alpha-terpinene, d-limonene and para-cymene possess a relatively benign (eco)toxicological profile.

At the same time, many of these terpenoid substances show a very limited water solubility, so that their use as plant protection products is challenging, because typical agricultural delivery systems are based upon using water as a vehicle carrier. Therefore, the use of such lipophilic terpenes as plant protection products is only possible when homogenous aqueous spray solutions of lipophilic terpenes can be obtained.

It was an object of the present invention to provide new solvent-based formulations based on lipophilic active ingredients, especially terpenes, which could form upon dilution with water a homogenous aqueous mixture. A homogenous distribution of the formulated lipophilic active ingredients (AI), especially terpenes, ensures that no concentration gradients of AI occur during the spraying of the spray solution. Otherwise the AI would not be able to induce a homogeneous and reliable biological performance along the application field. Additionally, a potential blockage of application equipment as a result of separated formulation particles/oil would be avoided.

It is also desirable that the process of generating a homogenous spray solution by way of mixing the formulated lipophilic AIs, especially terpenes, with water should succeed with minimum mechanical input.

Moreover, the resulting spray solutions should be physically stable for an amount of time relevant for the typical application conditions of formulated plant protection products on the field.

SUMMARY

Therefore it was also an object of the present invention to provide stable formulations and that the lipophilic AI's, especially terpenes, and the aqueous medium should remain homogeneously mixed for at least 1 hour, preferably for a period of at least 24 hours.

A typical agricultural formulation for the delivery of lipophilic substances is an emulsion concentrate (EC). These formulations are based on non-water soluble solvents/components, which upon addition to water spontaneously generate an emulsion of the non-water soluble components in the aqueous medium.

An example is known whereby the preparation of EC formulations of lipophilic substances in butyl lactate is described (US-A 2007/0178128). However, these formulations fail to attain sufficiently long-lived homogenous spray solutions, so that substantial separation of the oil and water components is observed after 1 hour, and this separation is not reversible.

The present invention now provides a solution for using potentially biologically active lipophilic AI's, especially terpenoids, as plant protection products in the form of an emulsifiable concentrate. A method for preparing self-emulsifying novel emulsion concentrate formulations of lipophilic terpenoid substances is described. Additionally, the emulsion concentrate formulations according to the invention produce spray solutions which either remain homogenous for at least 24 hours, or which can be homogenized with gentle stirring and shaking when partially separating after 24 hours.

The aforementioned objectives were solved by providing a new emulsion concentrate containing one or more terpenes or mixture of terpenes, at least one lactic acid ester and at least one non-ionic surfactant, especially an ethoxylated fatty oil.

The present invention is directed to pesticidal composition comprising
  a) one or more terpenes or mixtures thereof,
  b) at least one lactic acid ester,
  c) at least one water-immiscible solvent and
  d) at least one non-ionic surfactant.

The present invention is also directed to pesticidal composition comprising
  a1) one or more lipophilic insecticidal, fungicidal or herbicidal compound or mixtures thereof,
  b) at least one lactic acid ester,
  c) at least one water-immiscible solvent and
  d) at least one non-ionic surfactant.

DETAILED DESCRIPTION OF A PREFERRED EMBODIMENT

Preferred compositions according to the invention additionally comprise
  e) at least one anionic surfactant.

The compositions according to the invention are preferably emulsion concentrates (EC).

As used herein, the term "terpene" or "terpenoid substance" refers to chemical substances of plant origin, containing between 10 and 15 carbons, and whose biosynthetic pathway may be attributed to the modification of Geranylpyrophosphate or Farnesylpyrophosphate.

When terpenes are modified chemically, such as by oxidation or rearrangement of the carbon skeleton, the resulting compounds are generally referred to as terpenoids. In the following the term "terpene" is used for terpenes ans terpenoids.

Terpenes are chemical compounds that are widespread in nature, mainly in plants as constituents of essential oils. Their building block is the hydrocarbon isoprene $(C_5H_8)_n$.

Examples of useful terpenes a) include citral, pinene, nerol, β-ionone, geraniol, carvacrol, eugenol, carvone, citonellal, terpeniol, anethole, camphor, menthol, limonene, nerolidol, farnesol, phytol, carotene (vitamin Al), squalene, thymol, tocotrienol, perillyl alcohol, borneol, myrcene, simene, carene, terpenene, and linalool.

Preferred terpenes a) are (rac)-camphor, p-cymene, (−)-α-pinene, (rac)-citronellal, eugenol, geraniol, D-limonene, linalool, α-terpinene, and thymol. More preferred are p-cymene, D-limonene, α-terpinene Preferred terpene mixtures a) are α-terpinene plus D-limonene plus p-cymene (6:1.8:2.2), α-pinene plus (rac)-citronellal plus eugenol (1:1:1), geraniol plus linalool plus (rac)-camphor (1:1:1), α-pinene plus thymol (1:1), citronellal plus linalool plus thymol (1:1:1), thymol (1:1) and eugenol plus linalool (1:1). More preferred are α-terpinene plus D-limonene plus p-cymene (6:1.8:2.2)

Examples for lipophilic insecticidal compounds are azamethiphos, azinphos-methyl, chlorpyrifos, chlorpyrifos-methyl, chlorfenvinphos, diazinon, disulfoton, ethion, fenitrothion, fenthion, isoxathion, malathion, methidathion, methyl-parathion, paraoxon, parathion, phenthoate, phosalone, phosmet, phorate, phoxim, pirimiphos-methyl, profenofos, prothiofos, tetrachlorvinphos, terbufos, triazophos, alanycarb, aldicarb, bendiocarb, benfuracarb, carbaryl, carbofuran, carbosulfan, fenoxycarb, furathiocarb, methiocarb, pirimicarb, propoxur, thiodicarb, triazamate, allethrin, bifenthrin, cyfluthrin, beta-cyfluthrin, cyhalothrin, cyphenothrin, cypermethrin, alpha-cypermethrin, beta-cypermethrin, zeta-cypermethrin, deltamethrin, esfenvalerate, etofenprox, fenpropathrin, fenvalerate, imiprothrin, lambda-cyhalothrin, gamma-cyhalothrin, permethrin, prallethrin, pyrethrin I and II, resmethrin, silafluofen, tau-fluvalinate, tefluthrin, tetramethrin, tralomethrin, transfluthrin, profluthrin, dimefluthrin, chlorfluazuron, diflubenzuron, flucycloxuron, flufenoxuron, hexaflumuron, lufenuron, novaluron, teflubenzuron, triflumuron; buprofezin, diofenolan, hexythiazox, etoxazole, clofentazine, ecdysone antagonists: halofenozide, methoxyfenozide, tebufenozide, azadirachtin, juvenoids: pyriproxyfen, methoprene, fenoxycarb, spirodiclofen, spiromesifen, spirotetramat, clothianidin, dinotefuran, flupyradifurone, imidacloprid, thiamethoxam, nitenpyram, acetamiprid, thiacloprid, endosulfan, ethiprole, fipronil, vaniliprole, pyrafluprole, pyriprole, abamectin, emamectin, milbemectin, lepimectin, spinosad, spinetoram, fenazaquin, pyridaben, tebufenpyrad, tolfenpyrad, flufenerim, acequinocyl, hydramethylnon, chlorfenapyr, diafenthiuron, propargitecryomazinepiperonyl butoxideindoxacarb, metaflumizone, chlorantraniliprole, cyantraniliprole, flubendiamide, tetraniliprole, benclothiaz, bifenazate, flonicamid, pyridalyl, pymetrozine, cyenopyrafen, flupyrazofos, cyflumetofen, bistrifluron or pyrifluquinazon.

Preferred insecticidal compounds are: allethrin, bifenthrin, cyfluthrin, beta-cyfluthrin, cyhalothrin, cyphenothrin, cypermethrin, alpha-cypermethrin, beta-cypermethrin, zeta-cypermethrin, deltamethrin, etofenprox, lambda-cyhalothrin, gamma-cyhalothrin, permethrin, pyrethrin I and II, tefluthrin, transfluthrin, spirodiclofen, spiromesifen, spirotetramat, clothianidin, flupyradifurone, imidacloprid, thiamethoxam, nitenpyram, acetamiprid, thiacloprid, ethiprole, fipronil, abamectin, emamectin, milbemectin, lepimectin, spinosad, spinetoram chlorantraniliprole, cyantraniliprole, flubendiamide, tetraniliprole, flonicamid, pymetrozine, cyenopyrafen or cyflumetofen.

Examples for lipophilic fungicidal compounds a1) are: azoxystrobin, coumethoxystrobin, coumoxystrobin, dimoxystrobin, enestroburin, fenaminstrobin, fenoxystrobin/ flufenoxystrobin, fluoxastrobin, kresoxim-methyl, metominostrobin, orysastrobin, picoxystrobin, pyraclostrobin, pyrametostrobin, pyraoxystrobin, trifloxystrobin, pyribencarb, triclopyricarb/chlorodincarb, famoxadone, fenamidone, cyazofamid, amisulbrom, benodanil, benzovindiflupyr, bixafen, boscalid, carboxin, fenfuram, fluopyram, flutolanil, fluxapyroxad, furametpyr, isofetamid, isopyrazam, mepronil, oxycarboxin, penflufen, penthiopyrad, sedaxane, tecloftalam, thifluzamide; diflumetorim, binapacryl, dinobuton, dinocap, fluazinam; ferimzone, fentinacetate, fentin chloride, fentin hydroxide ametoctradin, silthiofam, azaconazole, bitertanol, bromuconazole, cyproconazole, difenoconazole, diniconazole, diniconazole-M, epoxiconazole, fenbuconazole, fluquinconazole, flusilazole, flutriafol, hexaconazole, imibenconazole, ipconazole, metconazole, myclobutanil, oxpoconazole, paclobutrazole, penconazole, propiconazole, prothioconazole, simeconazole, tebuconazole, tetraconazole, triadimefon, triadimenol, triticonazole, uniconazole, imazalil, pefurazoate, prochloraz, triflumizol, fenarimol, nuarimol, pyrifenox, triforinealdimorph, dodemorph, dodemorph-acetate, fenpropimorph, tridemorph, fenpropidin, piperalin, spiroxamine, fenhexamid, benalaxyl, benalaxyl-M, kiralaxyl, metalaxyl, metalaxyl-M (mefenoxam), ofurace, oxadixyl, octhilinone, bupirimate, benomyl, carbendazim, fuberidazole, thiabendazole, thiophanate-methyl, diethofencarb, ethaboxam, pencycuron, fluopicolide, zoxamide, metrafenone, pyriofenone, yprodinil, mepanipyrim, pyrimethanilfluoroimid, iprodione, procymidone, vinclozolin, fenpiclonil, fludioxonilquinoxyfenedifenphos, iprobenfos, pyrazophos, isoprothiolanedicloran, quintozene, tecnazene, tolclofos-methyl, biphenyl, chloroneb, etridiazoledimethomorph, flumorph, mandipropamid, pyrimorph, benthiavalicarb, iprovalicarb, valifenalate, oxathiapiprolinanilazine, chlorothalonil, captafol, captan, folpet, dichlofluanid, dichlorophen, hexachlorobenzene, pentachlorphenole and its salts, phthalide, tolylfluanid, guanidine, dodine, dodine free base, guazatine, guazatine-acetate, iminoctadine, iminoctadine-triacetate, iminoctadine-tris(albesilate), dithianonpyroquilon, tricyclazole, carpropamid, dicyclomet, fenoxanil, acibenzolar-S-methyl, probenazole, isotianil, tiadinil, prohexadione-calciumchinomethionat, cyflufenamid, cymoxanil, dazomet, diclomezine, diphenylamin, fenpyrazamine, flumetover, flusulfamide, flutianil, methasulfocarb, nitrapyrin, nitrothalisopropyl, tolprocarb, proquinazid, tebufloquin, tecloftalam, triazoxideabscisic acid, ancymidol, 6-benzylaminopurine, brassinolide, butralin, cyclanilide, dimethipin, flumetralin, flurprimidol, fluthiacet, forchlorfenuron, gibberellic acid, inabenfide, mefluidide, N-6-benzyladenine, paclobutrazol, prohydrojasmon, thidiazuron, triapenthenol, 2,3,5-tri-iodobenzoic acid, N-(5-chloro-2-isopropylbenzyl)-N-cyclopropyl-3-(difluoromethyl)-5-fluoro-1-methyl-1H-pyrazole-4-carboxamide, N-(5-chloro-2-isopropylbenzyl)-N-cyclopropyl-3-(difluoromethyl)-5-fluoro-1-methyl-1H-pyrazole-4-carboxamide, 2-{3-[2-(1-{[3,5-bis(difluoromethyl)-1H-pyrazol-1-yl]acetyl}piperidin-4-yl)-1,3-thiazol-4-yl[-4,5-dihydro-1,2-oxazol-5-yl]phenyl methanesulfonate, 2-{3-[2-(1-{[3,5-bis(difluoromethyl)-1H-pyrazol-1-yl]acetyl}piperidin-4-yl)-1,3-thiazol-4-yl]-4,5-dihydro-1,2-oxazol-5-yl}-3-chlorophenylmethane-sulfonate, (3S,6S,7R,8R)-8-Benzyl-3-[({3-[(isobutyryloxy)methoxy]-4-methoxypyridin-2-yl}carbonyl)amino]-6-methyl-4,9-dioxo-1,5-dioxonan-7-yl2-methylpropanoat Lyserphenvalpyr) and uniconazole.

Preferred fungicidal compounds are: bixafen, fenamidone, fenhexamid, fluopicolide, fluopyram, fluoxastrobin, iprovalicarb, isotianil, isopyrazam, pencycuron, penflufen, propineb, tebuconazole, trifloxystrobin, ametoctradin, amisulbrom, azoxystrobin, benthiavalicarb-isopropyl, benzovindiflupyr, boscalid, carbendazim, chlorothanonil, cyazofamid, cyflufenamid, cymoxanil, cyproconazole, difenoconazole, ethaboxam, epoxiconazole, famoxadone, fluazinam, fluquinconazole, flusilazole, flutianil, fluxapyroxad, kresoxim-methyl, mancozeb, mandipropamid, metconazol, pyriofenone, folpet, metaminostrobin, oxathiapiprolin, penthiopyrad, picoxystrobin, probenazole, proquinazid, pyraclostrobin, sedaxane, spiroxamin, tebufloquin, tetraconazole, zoxamide, ziram, N-(5-chloro-2-isopropylbenzyl)-N-cyclopropyl-3-(difluoromethyl)-5-fluoro-1-methyl-1H-pyrazole-4-carboxamide, N-(5-chloro-2-isopropylbenzyl)-N-cyclopropyl-3-(difluoromethyl)-5-fluoro-1-methyl-1H-pyrazole-4-carboxamide, 2-{3-[2-(1-{[3,5-bis(difluoromethyl)-1H-pyrazol-1-yl]acetyl}piperidin-4-yl)-1,3-thiazol-4-yl]-4,5-diydro-1,2-oxazol-5-yl}phenyl methanesulfonate, 2-{3-[2-(1-{[3,5-bis(difluoromethyl)-1H-pyrazol-1-yl]acetyl}piperidin-4-yl)-1,3-thiazol-4-yl]-4,5-dihydro-1,2-oxazol-5-yl}-3-chlorophenylmethane-sulfonate, (3S,6S,7R,8R)-8-Benzyl-3-[({3-[(isobutyryloxy)methoxy]-4-methoxypyridin-2-yl}carbonyl)amino]-6-methyl-4,9-dioxo-1,5-dioxonan-7-yl2-methylpropanoat Lyserphenvalpyr).

Examples for lipophilic herbicidal compounds are acetochlor, alachlor, butachlor, dimethachlor, dimethenamid, flufenacet, mefenacet, metolachlor, metazachlor, napropamide, naproanilide, pethoxamid, pretilachlor, propachlor, thenylchlor; clodinafop, cyhalofop-butyl, fenoxaprop, fluazifop, haloxyfop, metamifop, propaquizafop, quizalofop, quizalofop-P-tefuryl; asulam, butylate, carbetamide, desmedipham, dimepiperate, eptam (EPTC), esprocarb, molinate, orbencarb, phenmedipham, prosulfocarb, pyributicarb, thiobencarb, triallate; butroxydim, cycloxydim, profoxydim, sethoxydim, tepraloxydim, tralkoxydim; benfluralin, ethalfluralin, oryzalin, pendimethalin, prodiamine, trifluralin; acifluorfen, aclonifen, bifenox, diclofop, ethoxyfen, fomesafen, lactofen, oxyfluorfen; bromoxynil, dichlobenil, ioxynil; imazamethabenz, imazamox, imazapic, imazaquin; clomeprop, 2,4-dichlorophenoxyacetic acid (2,4-D), 2,4-DB, dichlorprop, MCPA, MCPA-thioethyl, MCPB, Mecoprop; chloridazon, flufenpyr-ethyl, fluthiacet, norflurazon, pyridate; aminopyralid, clopyralid, diflufenican, dithiopyr, fluridone, fluroxypyr, picloram, picolinafen, thiazopyr; amidosulfuron, azimsulfuron, bensulfuron, chlorimuron-ethyl, chlorsulfuron, cinosulfuron, cyclosulfamuron, ethoxysulfuron, flazasulfuron, flucetosulfuron, flupyrsulfuron, foramsulfuron, halosulfuron, imazosulfuron, iodosulfuron, mesosulfuron, metazosulfuron, metsulfuron-methyl, nicosulfuron, oxasulfuron, primisulfuron, prosulfuron, pyrazosulfuron, rimsulfuron, sulfometuron, sulfosulfuron, thifensulfuron, triasulfuron, tribenuron, trifloxysulfuron, triflusulfuron, tritosulfuron; ametryn, atrazine, cyanazine, dimethametryn, ethiozin, hexazinone, metamitron, metribuzin, prometryn, simazine, terbuthylazine, terbutryn, triaziflam; chlorotoluron, daimuron, diuron, fluometuron, isoproturon, linuron, methabenzthiazuron, tebuthiuron; cloransulam-methyl, diclosulam, florasulam, flucarbazone, flumetsulam, metosulam, ortho-sulfamuron, penoxsulam, propoxycarbazone, pyribambenz-propyl, pyribenzoxim, pyriftalid, pyriminobac-methyl, pyrimisulfan, pyrithiobac, pyroxasulfone, pyroxsulam; amicarbazone, anilofos, beflubutamid, benazolin, bencarbazone, benfluresate, benzofenap, bentazone, benzobicyclon, bicyclopyrone, bromacil, bromobutide, butafenacil, butamifos, cafenstrole, carfentrazone, cinidon-ethyl, chlorthal, cinmethylin, clomazone, cumyluron, cyprosulfamide, dicamba, diflufenzopyr, ethofumesate, etobenzanid, fenoxasulfone, fentrazamide, flumiclorac-pentyl, flumioxazin, flupoxam, flurochloridone, flurtamone, indanofan, isoxaben, isoxaflutole, lenacil, propanil, propyzamide, quinclorac, quinmerac, mesotrione, naptalam, oxadiargyl, oxadiazon, oxaziclomefone, pentoxazone, pinoxaden, pyraclonil, pyraflufen-ethyl, pyrasulfotole, pyrazoxyfen, pyrazolynate, quinoclamine, saflufenacil, sulcotrione, sulfentrazone, terbacil, tefuryltrione, tembotrione, thiencarbazone.

When the terms lactic acid esters b) are used throughout the description, it is meant to include both optical isomers as well as mixtures thereof.

Suitable lactic acid esters b) according to the invention are lactic acid esters of $C_1$ to $C_{12}$, preferred $C_2$ to $C_8$, more preferred $C_2$ to $C_4$ saturated and unsaturated alkyl, $C_5$ to $C_{12}$ saturated and unsaturated cyclically $C_1$ to $C_{12}$ saturated and unsaturated branched alkyl lactic esters and mixtures thereof.

Preferred lactic acid esters b) are methyl lactate, ethyl lactate, n-propyl lactate, butyl lactate, 2-ethyl hexyl lactate, cyclohexyl lactate, 2-methylcyclohexyl lactate, heptyl lactate, octyl lactate, lauryl lactate, as either pure R or S enantiomer, as a racemate, or as an enantioenriched mixture.

A more particularly preferable lactic acid ester b) is butyl lactate which is an ester of n-butanol with lactic acid, preferably L-(+)-lactic acid, such as is obtainable, for example, as Purasolv® BL from Purac Bioquimica (Gran Vial 19-25, 08160 Montmelo-Barcelona, Spain) or Purac Biochem (Gorinchem, NL), or as Galaster® BL 97 from Galactic (Place d'Escanaffles 237760 Escanaffles—Belgium), or as Steposol® BL from Stepan (22 West Frontage Rd. Northfield, Ill. 60093-USA).

Water-immiscible fluids c) are vegetable or mineral oils or esters of vegetable or mineral oils.

Suitable vegetable oils are all oils which can customarily be employed in agrochemical agents and can be obtained from plants. By way of example, sunflower oil, rapeseed oil, olive oil, castor oil, colza oil, corn oil, cottonseed oil and soya bean oil, peanut oil, palm oil, coconut oil, linseed oil, thistle oil, walnut oil may be mentioned. Possible esters are ethylhexyl palmitate, ethylhexyl oleate, ethylhexyl myristate, ethylhexyl caprylate, iso-propyl myristate, iso-propyl palmitate, methyl oleate, methyl palmitate, ethyl oleate, by way of example Rape seed oil methyl ester and ethylhexyl palmitate are preferred. Possible mineral oils are Exxsol® D100 and white oils.

Suitable non-ionic surfactants d) are ethoxylated fatty oils. As used herein, the term "ethoxylated fatty oil" refers to substances which are classified under the CAS numbers 70377-91-2 (Vegetable oils, ethoxylated). Preferred are substances which are classified under the CAS numbers 61791-23-9 (Soybean oil, ethoxylated), 165658-60-6 (rape oil, ethoxylated) or 61791-12-6 (Castor oil, ethoxylated). More preferred non-ionic surfactants are CAS No. 61791-23-9 (Soybean oil, ethoxylated) and CAS No. 61791-12-6 (Castor oil, ethoxylated), most preferred is CAS No. 61791-12-6 (Castor oil, ethoxylated).

The ethoxylated fatty oil d) comprises 5 to 40 ethylene oxide units per molecule, preferably 10 to 30 ethylene oxide units, more preferably 10 to 20 ethylene oxide units.

In a preferred embodiment compound d) is ethoxylated castor oil which comprises 5 to 40 ethylene oxide units per molecule, preferably 10 to 30 ethylene oxide units, more preferably 10 to 20 ethylene oxide units.

Examples of "ethoxylated fatty oils" are given in Table 1.

TABLE 1 commercially available compounds d)

| Tradename | Company | Average EO-Units | Chemical description |
|---|---|---|---|
| Agnique CSO 25 | BASF | 25 | Ethoxylated Castor Oil |
| Agnique ® CSO 30 | BASF | 30 | Ethoxylated Castor Oil |
| Agnique ® CSO 40 | BASF | 40 | Ethoxylated Castor Oil |
| Alkamuls ® A | Solvay | 6 | Ethoxylated Castor Oil |
| Alkamuls ® 696 | Solvay | 13 | Ethoxylated Castor Oil |
| Alkamuls ® R/81 | Solvay | 18 | Ethoxylated Castor Oil |
| Alkamuls ® RC | Solvay | 22 | Ethoxylated Castor Oil |
| Alkamuls ® OR/36 | Solvay | 36 | Ethoxylated Castor Oil |
| Alkamuls ® OR/40 | Solvay | 40 | Ethoxylated Castor Oil |
| Emulpon ® CO-100 | Akzo Nobel | 10 | Ethoxylated Castor Oil |
| Emulpon ® CO-200 | Akzo Nobel | 20 | Ethoxylated Castor Oil |
| Emulpon ® CO-360 | Akzo Nobel | 40 | Ethoxylated Castor Oil |
| Emulsogen ® EL 300 | Clariant | 30 | Ethoxylated Castor Oil |
| Emulsogen ® EL 360 | Clariant | 36 | Ethoxylated Castor Oil |
| Emulsogen ® EL 400 | Clariant | 40 | Ethoxylated Castor Oil |
| Emulsogen ® EL 540 | Clariant | 54 | Ethoxylated Castor Oil |
| Etocas ® 5 | Croda | 5 | Ethoxylated Castor Oil |
| Etocas ® 10 | Croda | 10 | Ethoxylated Castor Oil |
| Etocas ® 15 | Croda | 15 | Ethoxylated Castor Oil |
| Etocas ® 30 | Croda | 30 | Ethoxylated Castor Oil |
| Etocas ® 40 | Croda | 40 | Ethoxylated Castor Oil |
| Lucramul ® CO 08 | Levaco | 8 | Ethoxylated Castor Oil |
| Lucramul ® CO 11 | Levaco | 11 | Ethoxylated Castor Oil |
| Lucramul ® CO 30 | Levaco | 30 | Ethoxylated Castor Oil |
| Lucramul ® CO 40 | Levaco | 40 | Ethoxylated Castor Oil |
| Toximul ® 8243 | Stepan | 20 | Ethoxylated Castor Oil |
| Toximul ® 8241 | Stepan | 30 | Ethoxylated Castor Oil |
| Toximul 8242 | Stepan | 40 | Ethoxylated Castor Oil |
| Termul ® 3535 | Huntsman | 30 | Ethoxylated Castor Oil |
| Termul ® 3541 | Huntsman | 40 | Ethoxylated Castor Oil |
| Crovol ® CR70 | Croda | 20 | Ethoxylated Rapeseed Oil |
| Lucramul ® SO21 | Levaco | 21 | Ethoxylated Soybean oil |

Suitable anionic surfactants e) are mono- or diesterified phosphoric acids, which may be a compound of the general formula (I),

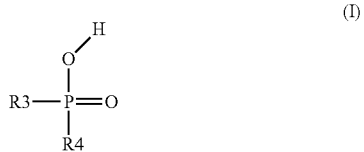

(I)

wherein
R3 is a hydroxy group or —(OCH$_2$)$_n$OR5,
R4 is a hydroxy group or —(OCH$_2$)$_m$OR6,
n is 0, 1, 2, 3, 4, 5, 6, 7, 8, 9, 10, 11, 12, 13, 14, 15, 16, 17, 18, 19 or 20,
m is 0, 1, 2, 3, 4, 5, 6, 7, 8, 9, 10, 11, 12, 13, 14, 15, 16, 17, 18, 19 or 20,
R5 and R6 are each independently of one another a hydrocarbon group, unsubstituted or substituted, branched or linear, cyclic, non-cyclic or heterocyclic, saturated or unsaturated, aromatic, non-aromatic or heteroaromatic comprising 8, 9, 10, 11, 12, 13, 14, 15, 16, 17, 18, 19, 20, 21, 22, 23, 24, 25, 26, 27, 28, 29 or 30 carbon atoms,
with the proviso that both R3 and R4 are not hydroxy groups simultaneously.

In a preferred embodiment of the present invention, the mono- or diesterified phosphoric acid may be selected from the group consisting of mono- and di-[octyl polyglycolether (3 EO)] phosphate as well as mixtures thereof, mono- and di-[octyl polyglycolether (5 EO)] phosphate as well as mixtures thereof, mono- and di-[decyl polyglycolether (4 EO)] phosphate as well as mixtures thereof, mono- and di-[decyl polyglycolether (5 EO)] phosphate as well as mixtures thereof, mono- and di-[decyl polyglycolether (6 EO)] phosphate as well as mixtures thereof, mono- and di-[decyl polyglycolether (9 EO)] phosphate as well as mixtures thereof, mono- and di-[undecyl polyglycolether (3 EO)] phosphate as well as mixtures thereof, mono- and di-[undecyl polyglycolether (5 EO)] phosphate as well as mixtures thereof, mono- and di-[undecyl polyglycolether (6 EO)] phosphate as well as mixtures thereof, mono- and di-[undecyl polyglycolether (10 EO)] phosphate as well as mixtures thereof, mono- and di-[dodecyl polyglycolether (3 EO)] phosphate as well as mixtures thereof, mono- and di-[dodecyl polyglycolether (5 EO)] phosphate as well as mixtures thereof, mono- and di-[dodecyl polyglycolether (6 EO)] phosphate as well as mixtures thereof, mono- and di-[dodecyl polyglycolether (10 EO)] phosphate as well as mixtures thereof, mono- and di-[tridecyl polyglycolether (3 EO)] phosphate as well as mixtures thereof, mono- and di-[tridecyl polyglycolether (5 EO)] phosphate as well as mixtures thereof, mono- and di-[tridecyl polyglycolether (6 EO)] phosphate as well as mixtures thereof, mono- and di-[tridecyl polyglycolether (9 EO)] phosphate as well as mixtures thereof, mono- and di-[tridecyl polyglycolether (10 EO)] phosphate as well as mixtures thereof, mono- and di-[tridecyl polyglycolether (20 EO)] phosphate as well as mixtures thereof, mono- and di-[isotridecyl polyglycolether (3 EO)] phosphate as well as mixtures thereof, mono- and di-[isotridecyl polyglycolether (5 EO)] phosphate as well as mixtures thereof, mono- and di-[isotridecyl polyglycolether (6 EO)] phosphate as well as mixtures thereof, mono- and di-[isotridecyl polyglycolether (9 EO)] phosphate as well as mixtures thereof, mono- and di-[isotridecyl polyglycolether (10 EO)] phosphate as well as mixtures thereof, mono- and di-[isotridecyl polyglycolether (20 EO)] phosphate as well as mixtures thereof, mono- and di-[tetradecyl polyglycolether (3 EO)] phosphate as well as mixtures thereof, mono- and di-[tetradecyl polyglycolether (6 EO)] phosphate as well as mixtures thereof, mono- and di-[tetradecyl polyglycolether (10 EO)] phosphate as well as mixtures thereof, mono- and di-[pentadecyl polyglycolether (2 EO)] phosphate as well as mixtures thereof, mono- and di-[pentadecyl polyglycolether (3 EO)] phosphate as well as mixtures thereof, mono- and di-[hexadecyl polyglycolether (2 EO)] phosphate as well as mixtures thereof, mono- and di-[hexadecyl polyglycolether (3 EO)] phosphate as well as mixtures thereof, mono- and di-[heptadecyl polyglycolether (2 EO)] phosphate as well as mixtures thereof, mono- and di-[heptadecyl polyglycolether (3 EO)] phosphate as well as mixtures thereof, mono- and di-[octadecyl polyglycolether (3 EO)] phosphate as well as mixtures thereof, mono- and di-[octadecyl polyglycolether (5 EO)] phosphate as well as mixtures thereof, mono- and di-[octadecyl polyglycolether (7 EO)] phosphate as well as mixtures thereof, mono- and di-[octadecyl polyglycolether (10 EO)] phosphate as well as mixtures thereof, mono- and di-[oleyl polyglycolether (3 EO)] phosphate as well as mixtures thereof, mono- and di-[oleyl polyglycolether (5 EO)] phosphate as well as mixtures thereof, mono- and di-[oleyl polyglycolether (7 EO)] phosphate as well as mixtures thereof, mono- and di-[oleyl polyglycolether (10 EO)] phosphate as well as mixtures thereof.

Examples of "mono- or diesterified phosphoric acids" are given in Table 2.

TABLE 2 commercially available phosphate ester surfactants (compounds e)

| Tradename | Company | R5 and/or R6 | n/m (Average) |
|---|---|---|---|
| Phospholan ® PS 541 | Akzo Nobel | C10 | 9 |
| Phospholan ® PS 236 | Akzo Nobel | C10-12 | 5 |
| Phospholan ® PS 222 | Akzo Nobel | C12-15 | 3 |
| Phospholan ® PS 131 | Akzo Nobel | C13 | 6 |
| Atlox ® AL-3382 | Croda | C8 | 5 |
| Crodafos ® D4A | Croda | C10 | 4 |
| Crodafos ® T5A | Croda | C13 | 5 |
| Crodafos ® T6A | Croda | C13 | 6 |
| Crodafos ® T10A | Croda | C13 | 10 |
| Crodafos ® CS2A | Croda | C15-17 | 2 |
| Crodafos ® O3A | Croda | C18 | 3 |
| Crodafos ® O5A | Croda | C18 | 5 |
| Crodafos ® O10A | Croda | C18 | 10 |
| Servoxyl ® VPT 3/85 | Elementis | C8 | 3 |
| Servoxyl ® VPDZ 3/100 | Elementis | C13 | 3 |
| Servoxyl ® VPDZ 6/100 | Elementis | C13 | 6 |
| Servoxyl ® VPDZ 9/100 | Elementis | C13 | 9 |
| Servoxyl ® VPDZ 20/100 | Elementis | C13 | 20 |
| Servoxyl ® VPFZ 7/100 | Elementis | C18 | 7 |
| Empiphos ® A5 D | Huntsman | C10-C12 | 5 |
| Empiphos ® O3 D | Huntsman | C18 | 3 |
| Rhodafac ® MB | Solvay | C13 | 3 |
| Rhodafac ® RS410 | Solvay | C11-C14 | 3 |
| Rhodafac ® RS710 | Solvay | C11-C14 | 10 |
| Rhodafac ® PA23 | Solvay | C10-C14 | 6 |
| Rhodafac ® PA33 | Solvay | C16-C18 | 3 |
| Stepfac ® 8180 | Stepan | C13 | 3 |
| Stepfac ® 8181 | Stepan | C13 | 6 |

In one embodiment formulations according to the invention contain compound a) in the concentration range of 1 to 45% w/w, preferably in the concentration range of 4 to 40% w/w, more preferably in the concentration range 9 to 30% w/w.

In one embodiment formulations according to the invention contain compound b) compound b) in the concentration range of 10 to 65% w/w, preferably in the concentration range of 10 to 40% w/w, more preferably in the concentration range 20 to 40% w/w.

In one embodiment formulations according to the invention contain compound c) in the concentration range of 5 to 40% w/w, preferably in the concentration range of 10 to 40% w/w, more preferably in the concentration range 20 to 40% w/w.

In one embodiment formulations according to the invention contain compound d) in the concentration range of 3 to 30% w/w, preferably in the concentration range of 7 to 20% w/w, more preferably in the concentration range 10 to 20% w/w.

In one embodiment formulations according to the invention contain component e) in the concentration range of 2 to 20% w/w, preferably in the concentration range 3 to 18% w/w, more preferably in the concentration range of 5 to 15% w/w.

Preferred pesticidal compositions according to the invention comprise
a) 1 to 45% w/w of one or more terpenes or mixtures thereof,
b) 10 to 65% w/w of at least one lactic acid ester,
c) 5 to 40% w/w of at least one water-immiscible solvent,
d) 3 to 30% w/w of at least one non-ionic surfactant and
e) 2 to 20% w/w of at least one anionic surfactant.

More preferred compositions according to the invention comprise
a) 4 to 40% w/w of one or more terpenes or mixtures thereof,
b) 10 to 40% w/w of at least one lactic acid ester,
c) 10 to 40% w/w of at least one water-immiscible solvent,
d) 7 to 20% w/w of at least one non-ionic surfactant and
e) preferably 3 to 18 w/w of at least one anionic surfactant.

Most preferred compositions according to the invention comprise
a) 9 to 30% w/w of one or more terpenes or mixtures thereof,
b) 20 to 40% w/w of at least one lactic acid ester,
c) 20 to 40% w/w of at least one water-immiscible solvent,
d) 10 to 20% w/w of at least one non-ionic surfactant and
e) 5 to 15% w/w of at least one anionic surfactant.

The herein described emulsifiable concentrates may be prepared by sequential mixing of all components until a homogeneous liquid is obtained. The order of addition is inconsequential, and the mixing may be performed at any temperature, as long as the components are fluid. An example of a process is as follows: The terpenes (compound a) are charged into a suitable reaction vessel (e.g. glass flask, or stainless steel reactor equiped with stirring equipment). The remaining components b), c), d) and e) are added to the reaction vessel, and the mixture is agitated at room temperature, or above room temperature, until a homogeneous mixture has been obtained.

In one embodiment the pesticidal composition according to the invention is applied to a target area or host in order to control sucking, rasping and chewing pests, such as aphids, mites, white flies and thrips.

In a particular embodiment the pesticidal composition according to the invention is applied to an insect, target area or host to control Asian citrus psyllids, green peach aphid, rosy apple aphid, spirea aphid, yellow aphid, black pecan aphid, turnip aphid, potato aphids, spirea aphid, silverleaf whitefly, sweetpotato whitefly, greenhouse whitefly, western flower thrips, eastern flower thrips, Florida flower thrips, onion thrips, chili thrips, citrus thrips, melon thrips, grape leafhoppers, variegated leafhoppers, and/or leafminers (*Liriomyza* spp.). In another embodiment, the pesticidal composition according to the invention is applied to an insect, a target area or host in order to control Lepidopterans (adults and/or larvae), such as melonworm, codling moth, oriental fruit moth, spotted tentiform leafminer, redbanded leafroller, and/or green fruitworm. In yet another embodiment the pesticidal composition according to the invention is applied to a target area or host to control mites such as the two-spotted spider mite, the Pacific spider mite, the European red mite, citrus rust mite, citrus red mite, Willamette spider mite, and/or the strawberry spider mite. In another embodiment, the pesticidal composition according to the invention is applied to a target area or host to control insects or mites that vector viral pathogens, or bacterial or fungal pathogens, which insects or mites and pathogens are described in detail above, and include, for example, whiteflies and psyllids that vector, for example, squash vein yellowing virus (which causes watermelon vine decline) or organisms that cause citrus greening or zebra chip disease, especially in potatoes, respectively.

All plants and plant parts can be treated in accordance with the invention. Here, plants are to be understood to mean all plants and plant parts such as wanted and unwanted wild plants or crop plants (including naturally occurring crop plants), for example cereals (wheat, rice, triticale, barley, rye, oats), maize, soya bean, potato, sugar beet, sugar cane, tomatoes, pepper, cucumber, melon, carrot, watermelon, onion, lettuce, spinach, leek, beans, Brassica oleracea (e.g. cabbage) and other vegetable species, cotton, tobacco, oilseed rape, and also fruit plants (with the fruits apples, pears, citrus fruits and grapevines). Crop plants can be plants which can be obtained by conventional breeding and optimization methods or by biotechnological and genetic engineering methods or combinations of these methods, including the transgenic plants and including the plant varieties which can or cannot be protected by varietal property rights. Plants should be understood to mean all developmental stages, such as seeds, seedlings, young (immature) plants up to mature plants. Plant parts should be understood to mean all parts and organs of the plants above and below ground, such as shoot, leaf, flower and root, examples given being leaves, needles, stalks, stems, flowers, fruit bodies, fruits and seeds, and also tubers, roots and rhizomes. Parts of plants also include harvested plants or harvested plant parts and vegetative and generative propagation material, for example seedlings, tubers, rhizomes, cuttings and seeds.

Treatment according to the invention of the plants and plant parts with the pesticidal compositions according to the invention is carried out directly or by allowing the compounds to act on the surroundings, environment or storage space by the customary treatment methods, for example by immersion, spraying, evaporation, fogging, scattering, painting on, injection and, in the case of propagation material, in particular in the case of seeds, also by applying one or more coats.

As already mentioned above, it is possible to treat all plants and their parts according to the invention. In a preferred embodiment, wild plant species and plant cultivars, or those obtained by conventional biological breeding methods, such as crossing or protoplast fusion, and also parts thereof, are treated. In a further preferred embodiment, transgenic plants and plant cultivars obtained by genetic engineering methods, if appropriate in combination with conventional methods (genetically modified organisms), and parts thereof are treated. The term "parts" or "parts of plants" or "plant parts" has been explained above. The invention is used with particular preference to treat plants of the respective commercially customary cultivars or those that are in use. Plant cultivars are to be understood as meaning plants having new properties ("traits") and which have been obtained by conventional breeding, by mutagenesis or by recombinant DNA techniques. They can be cultivars, varieties, bio- or genotypes.

The treatment of the plants and plant parts with the pesticidal composition according to the invention is carried out directly or by action on their surroundings, habitat or storage space using customary treatment methods, for example by dipping, spraying, atomizing, irrigating, evaporating, dusting, fogging, broadcasting, foaming, painting, spreading-on, injecting, watering (drenching), drip irrigating and, in the case of propagation material, in particular in the case of seed, furthermore as a powder for dry seed treatment, a solution for liquid seed treatment, a water-soluble powder for slurry treatment, by incrusting, by coating with one or more coats, etc. It is furthermore possible to apply the pesticidal composition according to the invention by the ultra-low volume method or to inject the application form or the pesticidal composition according to the invention itself into the soil.

A preferred direct treatment of the plants is foliar application, i.e. the pesticidal composition according to the invention are applied to the foliage, where treatment frequency and the application rate should be adjusted according to the level of infestation with the pest in question.

In the case of systemically active compounds, the pesticidal composition according to the invention also access the plants via the root system. The plants are then treated by the action of the pesticidal composition according to the invention on the habitat of the plant. This may be done, for example, by drenching, or by mixing into the soil or the nutrient solution, i.e. the locus of the plant (e.g. soil or hydroponic systems) is impregnated with a liquid form of the pesticidal composition according to the invention, or by soil application, i.e. the pesticidal composition according to the invention are introduced in solid form (e.g. in the form of granules) into the locus of the plants. In the case of paddy rice crops, this can also be done by metering the pesticidal composition according to the invention in a solid application form (for example as granules) into a flooded paddy field.

The invention is illustrated by the following examples.

EXAMPLES

In the preparation of the formulations in the following Examples the following components have been used:

The formulations were prepared by mixing the components as listed in Table 3 to 9.

The stability of the formulations was measured by diluting the formulation example to 1% in CIPAC C Water at room temperature, in a 100 mL graduated cylinder, and monitoring the amount of cream or oil separated after 1h and 24h. The results are given in Table 10.

TABLE 3

EC Formulations with single terpenes

| Ex. | Terpenoid | % w/w | Vegetable Oil | % w/w | Ethoxylated Fat/oil | % w/w | Lactic Acid Ester | % w/w | Alcohol Ethoxylate Phosphate | % w/w |
|---|---|---|---|---|---|---|---|---|---|---|
| 1-1 | (−)-alpha-pinene | 10.0 | Rapeseed oil | 36.5 | Etocas ® 10 | 10.0 | Butyl Lactate | 33.5 | Empiphos ® 03D | 10.0 |
| 1-2 | (rac)-citronellal | 10.0 | Rapeseed oil | 36.5 | Etocas ® 10 | 10.0 | Butyl Lactate | 33.5 | Empiphos ® 03D | 10.0 |
| 1-3 | linalool | 10.0 | Rapeseed oil | 36.5 | Etocas ® 10 | 10.0 | Butyl Lactate | 33.5 | Empiphos ® 03D | 10.0 |
| 1-4 | (rac)-camphor | 10.0 | Rapeseed oil | 36.5 | Etocas ® 10 | 10.0 | Butyl Lactate | 33.5 | Empiphos ® 03D | 10.0 |
| 1-5 | alpha-terpinene | 17.0 | Rapeseed oil | 36.5 | Etocas ® 10 | 12.5 | Butyl Lactate | 28.5 | Empiphos ® 03D | 5.5 |
| 1-6 | D-limonene | 17.0 | Rapeseed oil | 36.5 | Etocas ® 10 | 12.5 | Butyl Lactate | 28.5 | Empiphos ® 03D | 5.5 |
| 1-7 | p-cymene | 17.0 | Rapeseed oil | 36.5 | Etocas ® 10 | 12.5 | Butyl Lactate | 28.5 | Empiphos ® 03D | 5.5 |
| 1-8 | Eugenol | 10.0 | Rapeseed oil | 36.5 | Etocas ® 10 | 20.0 | Butyl Lactate | 18.5 | Empiphos ® 03D | 15.0 |
| 1-9 | Geraniol | 10.0 | Rapeseed oil | 36.5 | Etocas ® 10 | 20.0 | Butyl Lactate | 18.5 | Empiphos ® 03D | 15.0 |
| 1-10 | Thymol | 10.0 | Rapeseed oil | 36.5 | Alkamuls ® RC | 20.0 | Butyl Lactate | 18.5 | Empiphos ® 03D | 15.0 |
| 1-11 | Thymol | 10.0 | Rapeseed oil | 36.5 | Alkamuls ® RC | 20.0 | Butyl Lactate | 18.5 | Crodafos ® O10A | 15.0 |
| 1-12 | (−)-alpha-pinene | 20.0 | Rapeseed oil | 30.0 | Etocas ® 10 | 15.0 | Butyl Lactate | 25.0 | Crodafos ®O5A | 10.0 |

TABLE 3-continued

EC Formulations with single terpenes

| Ex. | Terpenoid | % w/w | Vegetable Oil | % w/w | Ethoxylated Fat/oil | % w/w | Lactic Acid Ester | % w/w | Alcohol Ethoxylate Phosphate | % w/w |
|---|---|---|---|---|---|---|---|---|---|---|
| 1-13 | Eugenol | 30.0 | Rapeseed oil | 30.0 | Etocas ® 10 | 15.0 | Butyl Lactate | 15.0 | Crodafos ®O5A | 10.0 |
| 1-14 | alpha-terpinene | 20.0 | Rapeseed oil | 30.0 | Etocas ® 10 | 15.0 | Butyl Lactate | 25.0 | Crodafos ®O5A | 10.0 |
| 1-15 | Linalool | 40.0 | Rapeseed oil | 20.0 | Etocas ® 10 | 15.0 | Butyl Lactate | 25.0 | Crodafos ®O5A | 10.0 |
| 1-16 | Geraniol | 20.0 | Rapeseed oil | 20.0 | Alkamuls ® RC | 15.0 | Butyl Lactate | 35.0 | Empiphos ® 03D | 10.0 |
| 1-17 | Thymol | 5.0 | Rapeseed oil | 40.0 | Alkamuls ® RC | 20.0 | Butyl Lactate | 20.0 | Empiphos ® 03D | 15.0 |

TABLE 4

EC Formulations with Terpene Mixtures

| Ex. | Terpene Mixture | % w/w | Vegetable Oil | % w/w | Ethoxylated Fat/oil | % w/w | Lactic Acid Ester | % w/w | Alcohol Ethoxylate Phosphate | % w/w |
|---|---|---|---|---|---|---|---|---|---|---|
| 2-1 | Alpha-terpinene + D-limonene + p-cymene (6:1.8:2.2) | 17.0 | Rapeseed oil | 36.5 | Etocas ® 10 | 6.2 | Butyl Lactate | 38.0 | Empiphos ® 03D | 2.3 |
| 2-2 | Alpha-terpinene + D-limonene + p-cymene (6:1.8:2.2) | 17.0 | Rapeseed oil | 36.5 | Etocas ® 10 | 12.5 | Butyl Lactate | 28.5 | Empiphos ® 03D | 5.5 |
| 2-3 | Alpha-terpinene + D-limonene + p-cymene (6:1.8:2.2) | 17.0 | Rapeseed oil | 36.5 | Etocas ® 10 | 20.0 | Butyl Lactate | 14.5 | Empiphos ® 03D | 12.0 |
| 2-4 | Alpha-pinene + (rac)-citronellal + eugenol (1:1:1) | 9.0 | Rapeseed oil | 30.0 | Alkamuls ® RC | 10.0 | Butyl Lactate | 41.0 | Empiphos ® 03D | 10.0 |
| 2-5 | Alpha-pinene + (rac)-citronellal + eugenol (1:1:1) | 9.0 | Rapeseed oil | 30.0 | Alkamuls ® RC | 10.0 | Propyl Lactate | 41.0 | Empiphos ® 03D | 10.0 |
| 2-6 | Alpha-pinene + (rac)-citronellal + eugenol (1:1:1) | 18.0 | Rapeseed oil | 25.0 | Alkamuls ® RC | 15.0 | Butyl Lactate | 32.0 | Empiphos ® 03D | 10.0 |
| 2-7 | Geraniol + Linalool + (rac)-camphor (1:1:1) | 9.0 | Rapeseed oil | 30.0 | Alkamuls ® RC | 10.0 | Butyl Lactate | 41.0 | Empiphos ® 03D | 10.0 |
| 2-8 | Geraniol + Linalool + (rac)-camphor (1:1:1) | 18.0 | Rapeseed oil | 30.0 | Alkamuls ® RC | 10.0 | Butyl Lactate | 32.0 | Crodafos ® 05A | 10.0 |
| 2-9 | Alpha-pinene + Thymol (1:1) | 10.0 | Rapeseed oil | 40.0 | Etocas ® 10 | 15.0 | Butyl Lactate | 25.0 | Crodafos ® 05A | 10.0 |
| 2-10 | Citronellal + Linalool + Thymol (1:1:1) | 30.0 | Rapeseed oil | 30.0 | Alkamuls ® RC | 15.0 | Butyl Lactate | 15.0 | Empiphos ® 03D | 10.0 |
| 2-11 | Alpha-pinene + Thymol (1:1) | 4.0 | Rapeseed oil | 20.0 | Etocas ® 10 | 7.5 | Butyl Lactate | 64.5 | Crodafos ® 05A | 4.0 |
| 2-12 | Eugenol + Linalool (1:1) | 40.0 | Rapeseed oil | 10.0 | Etocas ® 10 | 20.0 | Butyl Lactate | 15.0 | Crodafos ® 05A | 15.0 |

TABLE 1

Terpene EC Formulations with different Lactic Acid Ester

| Ex. | Terpene Mixture | % w/w | Vegetable Oil | % w/w | Ethoxylated Fat/oil | % w/w | Lactic Acid Ester | % w/w | Alcohol Ethoxylate Phosphate | % w/w |
|---|---|---|---|---|---|---|---|---|---|---|
| 3-1 | Alpha-terpinene + D-limonene + p-cymene (6:1.8:2.2) | 17.0 | Rapeseed oil | 36.5 | Etocas ® 10 | 12.5 | Ethyl Lactate | 28.5 | Empiphos ® 03D | 5.5 |
| 3-2 | Alpha-terpinene + D-limonene + p-cymene (6:1.8:2.2) | 17.0 | Rapeseed oil | 36.5 | Etocas ® 10 | 20.0 | Methyl Lactate | 15.5 | Empiphos ® 03D | 11.0 |
| 3-3 | Alpha-terpinene + D-limonene + p-cymene (6:1.8:2.2) | 17.0 | Rapeseed oil | 25.0 | Etocas ® 10 | 12.5 | Methyl Lactate | 40.0 | Empiphos ® 03D | 5.5 |

TABLE 1-continued

Terpene EC Formulations with different Lactic Acid Ester

| Ex. | Terpene Mixture | % w/w | Vegetable Oil | % w/w | Ethoxylated Fat/oil | % w/w | Lactic Acid Ester | % w/w | Alcohol Ethoxylate Phosphate | % w/w |
|---|---|---|---|---|---|---|---|---|---|---|
| 3-4 | Alpha-terpinene + D-limonene + p-cymene (6:1.8:2.2) | 17.0 | Rapeseed oil | 25.0 | Etocas ® 10 | 12.5 | Butyl Lactate | 40.0 | Empiphos ® 03D | 5.5 |
| 3-5 | Alpha-terpinene + D-limonene + p-cymene (6:1.8:2.2) | 17.0 | Rapeseed oil | 36.5 | Alkamuls ® A | 10.0 | 2-ethyl-hexyl Lactate | 26.5 | Empiphos ® 03D | 10.0 |
| 3-6 | Alpha-terpinene + D-limonene + p-cymene (6:1.8:2.2) | 17.0 | Rapeseed oil | 36.5 | Etocas ® 10 | 12.5 | 2-ethyl-hexyl Lactate | 24.0 | Crodafos ® SG | 10.0 |
| 3-7 | Alpha-terpinene + D-limonene + p-cymene (6:1.8:2.2) | 17.0 | Rapeseed oil | 36.5 | Alkamuls ® RC | 10.0 | 2-ethyl-hexyl Lactate | 26.5 | Empiphos ® 03D | 10.0 |
| 3-8 | Alpha-terpinene + D-limonene + p-cymene (6:1.8:2.2) | 17.0 | Rapeseed oil | 36.5 | Etocas ® 10 | 12.5 | Lauryl Lactate | 24.0 | Crodafos ® SG | 10.0 |
| 3-9 | Geraniol + Linalool + (rac)-Camphor (1:1:1) | 9.0 | Rapeseed oil | 40.0 | Alkamuls ® RC | 15.0 | Ethyl Lactate | 26.0 | Crodafos ® O5A | 10.0 |
| 3-10 | Geraniol + Linalool + (rac)-Camphor (1:1:1) | 9.0 | Rapeseed oil | 40.0 | Etocas ® 10 | 15.0 | Ethyl Lactate | 26.0 | Crodafos ® O5A | 10.0 |
| 3-11 | Alpha-terpinene | 20.0 | Rapeseed oil | 25.0 | Etocas ® 10 | 15.0 | Methyl Lactate | 30.0 | Crodafos ® O5A | 10.0 |
| 3-12 | D-Limonene | 5.0 | Rapeseed oil | 25.0 | Etocas ® 10 | 20.0 | Methyl Lactate | 40.0 | Crodafos ® O5A | 10.0 |
| 3-13 | (−)-Alpha-pinene | 30.0 | Rapeseed oil | 30.0 | Etocas ® 10 | 17.5 | Methyl Lactate | 10.0 | Crodafos ® O5A | 12.5 |
| 3-14 | Alpha-terpinene | 20.0 | Rapeseed oil | 25.0 | Etocas ® 10 | 15.0 | Ethyl Lactate | 30.0 | Crodafos ® O5A | 10.0 |
| 3-15 | D-Limonene | 5.0 | Rapeseed oil | 25.0 | Etocas ® 10 | 20.0 | Ethyl Lactate | 40.0 | Crodafos ® O5A | 10.0 |
| 3-16 | (−)-Alpha-pinene | 30.0 | Rapeseed oil | 30.0 | Etocas ® 10 | 17.5 | Ethyl Lactate | 10.0 | Crodafos ® O5A | 12.5 |
| 3-17 | Alpha-terpinene | 20.0 | Rapeseed oil | 25.0 | Etocas ® 10 | 15.0 | Propyl Lactate | 30.0 | Crodafos ® O5A | 10.0 |
| 3-18 | (−)-Alpha-pinene | 30.0 | Rapeseed oil | 30.0 | Etocas ® 10 | 17.5 | Propyl Lactate | 10.0 | Crodafos ® O5A | 12.5 |
| 3-19 | Para-cymene | 30.0 | Rapeseed oil | 30.0 | Etocas ® 10 | 17.5 | Propyl Lactate | 10.0 | Crodafos ® O5A | 12.5 |
| 3-20 | Para-cymene | 5.0 | Rapeseed oil | 30.0 | Etocas ® 10 | 15.0 | Propyl Lactate | 35.0 | Crodafos ® O5A | 15.0 |
| 3-21 | Alpha-terpinene | 20.0 | Rapeseed oil | 30.0 | Etocas ® 10 | 20.0 | 2-ethyl hexyl lactate | 17.5 | Crodafos ® O5A | 12.5 |
| 3-22 | (rac)-citronellal | 5.0 | Rapeseed oil | 30.0 | Etocas ® 10 | 15.0 | 2-ethyl hexyl lactate | 40.0 | Crodafos ® O5A | 10.0 |

TABLE 6

Terpene EC Formulations with different Vegetable oils

| Ex. | Terpene Mixture | % w/w | Vegetable Oil | % w/w | Ethoxylated Fat/oil | % w/w | Lactic Acid Ester | % w/w | Alcohol Ethoxylate Phosphate | % w/w |
|---|---|---|---|---|---|---|---|---|---|---|
| 4-1 | Alpha-terpinene + D-limonene + p-cymene (6:1.8:2.2) | 17.0 | Sunflower oil | 36.5 | Etocas ® 10 | 12.5 | Butyl Lactate | 28.5 | Empiphos ® 03D | 5.5 |
| 4-2 | Alpha-terpinene + D-limonene + p-cymene (6:1.8:2.2) | 17.0 | Soybean oil | 36.5 | Etocas ® 10 | 12.5 | Butyl Lactate | 28.5 | Empiphos ® 03D | 5.5 |
| 4-3 | Alpha-terpinene + D-limonene + p-cymene (6:1.8:2.2) | 17.0 | Corn oil | 36.5 | Etocas ® 10 | 12.5 | Butyl Lactate | 28.5 | Empiphos ® 03D | 5.5 |
| 4-4 | Alpha-terpinene + D-limonene + p-cymene (6:1.8:2.2) | 17.0 | Canola oil | 36.5 | Etocas ® 10 | 12.5 | Butyl Lactate | 28.5 | Empiphos ® 03D | 5.5 |
| 4-5 | Linalool | 40.0 | Soybean oil | 20.0 | Etocas ® 10 | 15.0 | Butyl Lactate | 15.0 | Crodafos ® O5A | 10.0 |
| 4-6 | Eugenol | 30.0 | Corn oil | 30.0 | Etocas ® 10 | 15.0 | Butyl Lactate | 15.0 | Crodafos ® O5A | 10.0 |
| 4-7 | (−)-alpha pinene | 5.0 | Sunflower oil | 40.0 | Alkamuls ® RC | 20.0 | Butyl Lactate | 20.0 | Empiphos ® 03D | 15.0 |

TABLE 7

Terpene EC Formulations with different Ethoxylated Fat/Oil

| Ex. | Terpene Mixture | % w/w | Vegetable Oil | % w/w | Ethoxylated Fat/oil | % w/w | Lactic Acid Ester | % w/w | Alcohol Ethoxylate Phosphate | % w/w |
|---|---|---|---|---|---|---|---|---|---|---|
| 5-1 | Alpha-terpinene + D-limonene + p-cymene (6:1.8:2.2) | 17.0 | Rapeseed oil | 36.5 | Alkamuls ® RC | 12.5 | Butyl Lactate | 28.5 | Empiphos ® 03D | 5.5 |
| 5-2 | Alpha-terpinene + D-limonene + p-cymene (6:1.8:2.2) | 17.0 | Rapeseed oil | 36.5 | Lucramul ® CO30 | 12.5 | Butyl Lactate | 28.5 | Empiphos ® 03D | 5.5 |
| 5-3 | Alpha-terpinene + D-limonene + p-cymene (6:1.8:2.2) | 17.0 | Rapeseed oil | 36.5 | Alkamuls ® A | 12.5 | Butyl Lactate | 28.5 | Empiphos ® 03D | 5.5 |
| 5-4 | Alpha-terpinene + D-limonene + p-cymene (6:1.8:2.2) | 17.0 | Rapeseed oil | 36.5 | Emulsogen ® EL 40 | 12.5 | Butyl Lactate | 28.5 | Empiphos ® 03D | 5.5 |
| 5-5 | Alpha-terpinene + D-limonene + p-cymene (6:1.8:2.2) | 17.0 | Rapeseed oil | 36.5 | Lucramul ® SO 21 | 12.5 | Butyl Lactate | 28.5 | Empiphos ® 03D | 5.5 |
| 5-6 | Alpha-terpinene + D-limonene + p-cymene (6:1.8:2.2) | 17.0 | Rapeseed oil | 36.5 | Crovol ® CR70 | 20.0 | Butyl Lactate | 15.5 | Empiphos ® 03D | 11.0 |
| 5-7 | Alpha-terpinene + D-limonene + p-cymene (6:1.8:2.2) | 17.0 | Rapeseed oil | 36.5 | Etocas ® 10 | 20.0 | Butyl Lactate | 21.0 | Empiphos ® 03D | 5.5 |
| 5-8 | Alpha-terpinene + D-limonene + p-cymene (6:1.8:2.2) | 17.0 | Rapeseed oil | 36.5 | Alkamuls ® A | 20.0 | Butyl Lactate | 21.0 | Empiphos ® 03D | 5.5 |
| 5-9 | Alpha-terpinene + D-limonene + p-cymene (6:1.8:2.2) | 17.0 | Rapeseed oil | 36.5 | Alkamuls ® RC | 20.0 | Butyl Lactate | 21.0 | Empiphos ® 03D | 5.5 |
| 5-10 | Alpha-terpinene + D-limonene + p-cymene (6:1.8:2.2) | 17.0 | Rapeseed oil | 36.5 | Emulsogen ® EL 40 | 20.0 | Butyl Lactate | 21.0 | Empiphos ® 03D | 5.5 |
| 5-11 | (−)-alpha pinene | 5.0 | Rapeseed oil | 30.0 | Alkamuls ® RC | 15.0 | Butyl Lactate | 35.0 | Empiphos ® 03D | 10.0 |
| 5-12 | Alpha-terpinene | 20.0 | Rapeseed oil | 40.0 | Alkamuls ® A | 15.0 | Butyl Lactate | 15.0 | Empiphos ® 03D | 10.0 |
| 5-13 | p-cymene | 40.0 | Rapeseed oil | 20.0 | Lucramul ® CO30 | 15.0 | Butyl Lactate | 15.0 | Empiphos ® 03D | 10.0 |
| 5-14 | D-Limonene | 5.0 | Rapeseed oil | 40.0 | Lucramul ® SO21 | 15.0 | Butyl Lactate | 30.0 | Empiphos ® 03D | 10.0 |
| 5-15 | Geraniol | 10.0 | Rapeseed oil | 30.0 | Emulsogen ® EL 400 | 15.0 | Butyl Lactate | 35.0 | Empiphos ® 03D | 10.0 |

TABLE 8

Terpene EC Formulations with different Alcohol Ethoxylate Phosphate

| Ex. | Terpene Mixture | % w/w | Vegetable Oil | % w/w | Ethoxylated Fat/oil | % w/w | Lactic Acid Ester | % w/w | Alcohol Ethoxylate Phosphate | % w/w |
|---|---|---|---|---|---|---|---|---|---|---|
| 6-1 | Alpha-terpinene + D-limonene + p-cymene (6:1.8:2.2) | 17.0 | Rapeseed oil | 36.5 | Etocas ® 10 | 12.5 | Butyl Lactate | 28.5 | Crodafos 05A | 5.5 |
| 6-2 | Alpha-terpinene + D-limonene + p-cymene (6:1.8:2.2) | 17.0 | Rapeseed oil | 36.5 | Etocas ® 10 | 12.5 | Butyl Lactate | 28.5 | Crodafos CS2A | 5.5 |
| 6-3 | Alpha-terpinene + D-limonene + p-cymene (6:1.8:2.2) | 17.0 | Rapeseed oil | 36.5 | Etocas ® 10 | 12.5 | Butyl Lactate | 23.0 | Rhodafac MB | 11.0 |
| 6-4 | Alpha-terpinene + D-limonene + p-cymene (6:1.8:2.2) | 17.0 | Rapeseed oil | 36.5 | Etocas ® 10 | 20.0 | Butyl Lactate | 15.5 | Stepfac 8180 | 11.0 |
| 6-5 | Alpha-terpinene + D-limonene + p-cymene (6:1.8:2.2) | 17.0 | Rapeseed oil | 36.5 | Etocas ® 10 | 12.5 | Butyl Lactate | 28.5 | Rhodafac RS410 | 5.5 |
| 6-6 | Alpha-terpinene + D-limonene + p-cymene (6:1.8:2.2) | 17.0 | Rapeseed oil | 36.5 | Etocas ® 10 | 20.0 | Butyl Lactate | 10.5 | Rhodafac ®RS710 | 16.0 |
| 6-7 | Alpha-terpinene + D-limonene + p-cymene (6:1.8:2.2) | 17.0 | Rapeseed oil | 36.5 | Etocas ® 10 | 20.0 | Butyl Lactate | 10.5 | Rhodafac ®PA23 | 16.0 |
| 6-8 | Alpha-terpinene + D-limonene + p-cymene (6:1.8:2.2) | 17.0 | Rapeseed oil | 36.5 | Etocas ® 10 | 10.0 | Butyl Lactate | 26.5 | Crodafos ® D4A | 10.0 |

TABLE 8-continued

Terpene EC Formulations with different Alcohol Ethoxylate Phosphate

| Ex. | Terpene Mixture | % w/w | Vegetable Oil | % w/w | Ethoxylated Fat/oil | % w/w | Lactic Acid Ester | % w/w | Alcohol Ethoxylate Phosphate | % w/w |
|---|---|---|---|---|---|---|---|---|---|---|
| 6-9 | Alpha-terpinene + D-limonene + p-cymene (6:1.8:2.2) | 17.0 | Rapeseed oil | 36.5 | Etocas ® 10 | 20.0 | Butyl Lactate | 10.5 | Empiphos ® A5D | 16.0 |
| 6-10 | Alpha-terpinene + D-limonene + p-cymene (6:1.8:2.2) | 17.0 | Rapeseed oil | 36.5 | Etocas ® 10 | 12.5 | Butyl Lactate | 28.5 | Crodafos ® O3A | 5.5 |
| 6-11 | (−)-Alpha-pinene | 10.0 | Rapeseed oil | 40.0 | Etocas ® 10 | 12.5 | Butyl Lactate | 32.0 | Rhodafac ® RS410 | 5.5 |
| 6-12 | D-Limonene | 5.0 | Rapeseed oil | 30.0 | Etocas ® 10 | 12.5 | Butyl Lactate | 41.5 | Rhodafac ® MB | 11.0 |
| 6-13 | Alpha-terpinene | 40.0 | Rapeseed oil | 10.0 | Etocas ® 10 | 20.0 | Butyl Lactate | 14.0 | Rhodafac ® PA23 | 16.0 |
| 6-14 | p-cymene | 20.0 | Rapeseed oil | 20.0 | Etocas ® 10 | 20.0 | Butyl Lactate | 24.0 | Empiphos ® A5D | 16.0 |
| 6-15 | Eugenol | 10.0 | Rapeseed oil | 40.0 | Etocas ® 10 | 20.0 | Butyl Lactate | 14.0 | Rhodafac ® RS710 | 16.0 |
| 6-16 | (rac)-citronellal | 5.0 | Rapeseed oil | 40.0 | Etocas ® 10 | 12.5 | Butyl Lactate | 32.5 | Crodafos ® O3A | 10.0 |
| 6-17 | Geraniol | 15.0 | Rapeseed oil | 40.0 | Etocas ® 10 | 12.5 | Butyl Lactate | 22.5 | Crodafos ® O5A | 10.0 |
| 6-18 | D-Limonene | 30.0 | Rapeseed oil | 40.0 | Etocas ® 10 | 10.0 | Butyl Lactate | 10.0 | Crodafos ® D4A | 10.0 |

TABLE 9

Comparison Formulation according to US2007/0178128

| Ex. | Terpene Mixture | % w/w | Vegetable Oil | % w/w | Ethoxylated Fat/oil | % w/w | Lactic Acid Ester | % w/w | Alcohol Ethoxylate Phosphate | % w/w |
|---|---|---|---|---|---|---|---|---|---|---|
| 7-1 | Alpha-terpinene + D-limonene + p-cymene (10:2.5:5) | 17.5 | Rapeseed oil | — | Soybean Lecithin | 3.0 | Butyl Lactate | 79.0 | Genapol ® LRO Paste | 0.5 |

TABLE 10

Emulsion Stability of Terpenoid Emulsifiable Concentrates

| Formulation Example | Emulsion Stability (mL of separated oil or cream)* | | Emulsion Particle Size (d90, µm) |
|---|---|---|---|
| | 1 h | 24 h | |
| 1-1 | 0 | 0 | 28 |
| 1-2 | 0 | 0 | 27 |
| 1-3 | 0 | 0.25 | 20 |
| 1-4 | 0 | 0 | 19 |
| 1-5 | 0 | 0 | 7 |
| 1-6 | 0 | 0 | 8 |
| 1-7 | 0 | 0 | 22 |
| 1-8 | 0 | 0 | 5 |
| 1-9 | 0 | 0 | 2 |
| 1-10 | 0 | 0 | 1 |
| 1-11 | 0 | 0.1 | 4 |
| 1-12 | 0 | 0 | 9 |
| 1-13 | 0 | 0 | 14 |
| 1-14 | 0 | 0 | 1 |
| 1-15 | 0 | 0 | 12 |
| 1-16 | 0 | 0 | 8 |
| 1-17 | 0 | 0 | 17 |
| 2-1 | 0 | 1 | 28 |
| 2-2 | 0 | 0 | 6 |
| 2-3 | 0 | 0 | 1 |
| 2-4 | 0 | 0 | 24 |
| 2-5 | 0 | 0 | 13 |
| 2-6 | 0 | 0 | 1 |
| 2-7 | 0 | 0 | 34 |
| 2-8 | 0 | 0 | 2 |
| 2-9 | 0 | 0 | 7 |
| 2-10 | 0 | 0 | 2 |
| 2-11 | 0 | 0.1 | 71 |
| 2-12 | 0 | 0.75 | 47 |
| 3-1 | 0 | 0.3 | 18 |
| 3-2 | 0 | 0.2 | 5 |
| 3-3 | 0 | 0.5 | 20 |
| 3-4 | 0 | 0.05 | 21 |
| 3-5 | 0.1 | 1.2 | 30 |
| 3-6 | 0 | 0 | 11 |
| 3-7 | 0 | 1 | 30 |
| 3-8 | 0.1 | 1 | 44 |
| 3-9 | 0 | 0.5 | 260 |
| 3-10 | 0 | 0.5 | 260 |
| 3-11 | 0 | 0.2 | 6 |
| 3-12 | 0 | 0.3 | 6 |
| 3-13 | 0 | 0.1 | 12 |
| 3-14 | 0.1 | 0.3 | 7 |
| 3-15 | 0.1 | 0.2 | 23 |
| 3-16 | 0 | 0.1 | 5 |
| 3-17 | 0 | 0.2 | 3 |

TABLE 10-continued

Emulsion Stability of Terpenoid Emulsifiable Concentrates

| Formulation Example | Emulsion Stability (mL of separated oil or cream)* | | Emulsion Particle Size (d90, μm) |
|---|---|---|---|
| | 1 h | 24 h | |
| 3-18 | 0 | 0.05 | 5 |
| 3-19 | 0 | 0 | 14 |
| 3-20 | 0 | 0.5 | 80 |
| 3-21 | 0 | 0.05 | 110 |
| 3-22 | 0 | 0 | 27 |
| 4-1 | 0 | 0 | 11 |
| 4-2 | 0 | 0 | 7 |
| 4-3 | 0 | 0 | 17 |
| 4-4 | 0 | 0 | 20 |
| 4-5 | 0 | 0 | 22 |
| 4-6 | 0 | 0.5 | 20 |
| 4-7 | 0 | 0 | 0.5 |
| 5-1 | 0.1 | 1 | 78 |
| 5-2 | 0.1 | 1 | 1 |
| 5-3 | 0 | 0.5 | 12 |
| 5-4 | 0.1 | 1 | 40 |
| 5-5 | 0 | 0.5 | 11 |
| 5-6 | 0 | 0.7 | 12 |
| 5-7 | 0 | 0 | 1 |
| 5-8 | 0 | 0.05 | 6 |
| 5-9 | 0 | 0.1 | 8 |
| 5-10 | 0 | 0.2 | 35 |
| 5-11 | 0 | 0 | 1 |
| 5-12 | 0 | 1 | 27 |
| 5-13 | 0 | 0.1 | 10 |
| 5-14 | 0 | 0.1 | 4 |
| 5-15 | 0 | 0 | 6 |
| 6-1 | 0 | 0 | 3 |
| 6-2 | 0 | 0.1 | 27 |
| 6-3 | 0 | 0 | 4 |
| 6-4 | 0 | 0 | 1 |
| 6-5 | 0 | 0 | 18 |
| 6-6 | 0 | 0.5 | 32 |
| 6-7 | 0 | 0.3 | 31 |
| 6-8 | 0 | 0.7 | 46 |
| 6-9 | 0 | 0.5 | 33 |
| 6-10 | 0 | 0.2 | 10 |
| 6-11 | 0 | 0.3 | 15 |
| 6-12 | 0 | 0.2 | 22 |
| 6-13 | 0 | 0 | 33 |
| 6-14 | 0 | 0 | 14 |
| 6-15 | 0 | 0.5 | 47 |
| 6-16 | 0 | 0 | 15 |
| 6-17 | 0 | 0 | 1 |
| 6-18 | 0 | 1 | 52 |
| 7-1 | 1 | —† | —‡ |

(Example according to US2007/0178128)

*Emulsion stability was measured by diluting the formulation example to 1% in CIPAC C Water at room temperature, in a 100 mL graduated cylinder, and monitoring the amount of cream or oil separated after 1 h and 24 h.
†Not measured due to the low stability of the emulsion after 1 h.
‡Not possible due to low stability of emulsion.

The invention claimed is:

1. A pesticidal composition comprising
   a) 9 to 30% w/w of one or more terpenes or mixtures thereof,
   b) 20 to 40% w/w of butyl lactate,
   c) 20 to 40% w/w of rapeseed oil,
   d) 10 to 20% w/w of ethoxylated castor oil, and
   e) 5 to 15% w/w of at least one anionic surfactant,
wherein said at least one anionic surfactant e) comprises one or more mono- or diesterified phosphoric acids of formula (I),

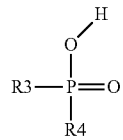

wherein
R3 is a hydroxy group or —(OCH$_2$)$_n$OR5,
R4 is a hydroxy group or —(OCH$_2$)$_m$OR6,
n is 0, 1, 2, 3, 4, 5, 6, 7, 8, 9, 10, 11, 12, 13, 14, 15, 16, 17, 18, 19 or 20,
m is 0, 1, 2, 3, 4, 5, 6, 7, 8, 9, 10, 11, 12, 13, 14, 15, 16, 17, 18, 19 or 20,
R5 and R6 are each independently of one another a hydrocarbon group, unsubstituted or substituted, branched or linear, cyclic, non-cyclic or heterocyclic, saturated or unsaturated, aromatic, non-aromatic or heteroaromatic comprising 8, 9, 10, 11, 12, 13, 14, 15, 16, 17, 18, 19, 20, 21, 22, 23, 24, 25, 26, 27, 28, 29 or 30 carbon atoms,
with the proviso that both R3 and R4 are not hydroxy groups simultaneously.

2. The pesticidal composition according to claim 1, wherein the ethoxylated castor oil d) comprises 5 to 40 ethylene oxide units per molecule.

3. A process for preparing the pesticidal composition according to claim 1 comprising mixing the a) terpenes, the b) butyl lactate, the c) rapeseed oil, d) the ethoxylated castor oil, and e) the anionic surfactant.

4. A product comprising the pesticidal composition according to claim 1 for application of agrochemical active compounds contained therein to one or more plants and/or a habitat thereof.

5. The pesticidal composition according to claim 1, comprising
   a) 9 to 30% w/w of a mixture of alpha-terpinene, D-limonene, and p-cymene, and
   e) 5 to 15% w/w of Oleth-3 phosphate (EMPIPHOS® O3D).

6. The pesticidal composition according to claim 1, wherein the ethoxylated castor oil d) comprises 10 to 30 ethylene oxide units per molecule.

7. The pesticidal composition according to claim 1, wherein the ethoxylated castor oil d) comprises 10 to 20 ethylene oxide units per molecule.

8. The pesticidal composition according to claim 1, wherein the one or more terpenes a) are selected from the group consisting of (rac)-camphor, p-cymene, (-)alpha-pinene, (rac)-citronellal, eugenol, geraniol, D-limonene, linalook, alpha-terpinene, and thymol.

9. The pesticidal composition according to claim 1, wherein the butyl lactate b) is a pure R or S enantiomer, a racemate, or an enantioenriched mixture.

10. A pesticidal composition consisting of
    a) 9 to 30% w/w of one or more terpenes or mixtures thereof,
    b) 20 to 40% w/w of butyl lactate,
    c) 20 to 40% w/w of rapeseed oil,
    d) 10 to 20% w/w of ethoxylated castor oil, and
    e) 5 to 15% w/w of at least one anionic surfactant,
wherein said at least one anionic surfactant e) comprises one or more mono- or diesterified phosphoric acids of formula (I),

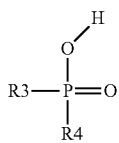

(I)

wherein

R3 is a hydroxy group or —(OCH$_2$)$_n$OR5,

R4 is a hydroxy group or —(OCH$_2$)$_m$OR6, n is 0, 1, 2, 3, 4, 5, 6, 7, 8, 9, 10, 11, 12, 13, 14, 15, 16, 17, 18, 19 or 20, m is 0, 1, 2, 3, 4, 5, 6, 7, 8, 9, 10, 11, 12, 13, 14, 15, 16, 17, 18, 19 or 20, R5 and R6 are each independently of one another a hydrocarbon group, unsubstituted or substituted, branched or linear, cyclic, non-cyclic or heterocyclic, saturated or unsaturated, aromatic, non-aromatic or heteroaromatic comprising 8, 9, 10, 11, 12, 13, 14, 15, 16, 17, 18, 19, 20, 21, 22, 23, 24, 25, 26, 27, 28, 29 or 30 carbon atoms, with the proviso that both R3 and R4 are not hydroxy groups simultaneously.

11. The pesticidal composition according to claim 10, wherein the ethoxylated castor oil d) comprises 5 to 40 ethylene oxide units per molecule.

12. A process for preparing the pesticidal composition according to claim 10 comprising mixing the a) terpenes, the b) butyl lactate, the c) rapeseed oil, d) the ethoxylated castor oil, and e) the anionic surfactant.

13. A product comprising the pesticidal composition according to claim 10 for application of agrochemical active compounds contained therein to one or more plants and/or a habitat thereof.

14. The pesticidal composition according to claim 10, consisting of a) 9 to 30% w/w of a mixture of alpha-terpinene, D-limonene, and p-cymene, b) 20 to 40% w/w of butyl lactate, c) 20 to 40% w/w of rapeseed oil, d) 10 to 20% w/w of ethoxylated castor oil, and e) 5 to 15% w/w of Oleth-3 phosphate (EMPIPHOS®O3D).

15. The pesticidal composition according to claim 10, wherein the ethoxylated castor oil d) comprises 10 to 30 ethylene oxide units per molecule.

16. The pesticidal composition according to claim 10, wherein the ethoxylated castor oil d) comprises 10 to 20 ethylene oxide units per molecule.

17. The pesticidal composition according to claim 10, wherein the one or more terpenes a) are selected from the group consisting of (rac)-camphor, p-cymene, (-)alpha-pinene, (rac)-citronellal, eugenol, geraniol, D-limonene, linalook, alpha-terpinene, and thymol.

18. The pesticidal composition according to claim 10, wherein the butyl lactate b) is a pure R or S enantiomer, a racemate, or an enantioenriched mixture.

* * * * *